(12) United States Patent
Phelan et al.

(10) Patent No.: US 11,042,665 B2
(45) Date of Patent: Jun. 22, 2021

(54) DATA CONNECTORS IN LARGE SCALE PROCESSING CLUSTERS

(71) Applicant: HEWLETT PACKARD ENTERPRISE DEVELOPMENT LP, Houston, TX (US)

(72) Inventors: Thomas A. Phelan, San Francisco, CA (US); Michael J. Moretti, Saratoga, CA (US); Joel Baxter, San Carlos, CA (US); Gunaseelan Lakshminarayanan, Cupertino, CA (US); Kumar Sreekanti, Pleasanton, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 815 days.

(21) Appl. No.: 14/532,289

(22) Filed: Nov. 4, 2014

(65) Prior Publication Data

US 2015/0127682 A1 May 7, 2015

Related U.S. Application Data

(60) Provisional application No. 61/899,656, filed on Nov. 4, 2013.

(51) Int. Cl.
*G06F 16/00* (2019.01)
*G06F 21/62* (2013.01)

(52) U.S. Cl.
CPC ...... *G06F 21/6227* (2013.01); *G06F 21/6236* (2013.01)

(58) Field of Classification Search
CPC .................. G06F 21/6227; G06F 21/6236
See application file for complete search history.

(56) References Cited

U.S. PATENT DOCUMENTS

| | | | |
|---|---|---|---|
| 8,532,973 B1* | 9/2013 | CaraDonna | G06F 3/067 703/13 |
| 8,756,338 B1* | 6/2014 | Potakamuri | G06F 3/061 709/202 |
| 2003/0177330 A1* | 9/2003 | Idei | G06F 3/0611 711/202 |
| 2005/0021858 A1* | 1/2005 | Ruston | G06F 17/30887 709/246 |
| 2011/0213814 A1* | 9/2011 | Fukatani | G06F 17/30221 707/827 |

* cited by examiner

*Primary Examiner* — Khanh B Pham
(74) *Attorney, Agent, or Firm* — Hewlett Packard Enterprise Patent Department

(57) ABSTRACT

Systems, methods, and software described herein facilitate interfacing between processing nodes and a plurality of data repositories. In one example, a method of interfacing between a processing node and a plurality of data repositories includes identifying, for the processing node, a data access request using a first data access format, wherein the data access request includes a data connector identifier. The method further includes translating the access request to a second data access format based on the data connector identifier, and identifying a data repository in the plurality of data repositories to service the data access request based on the data connector identifier. The method also provides accessing data for the data access request in the data repository via the second data access format.

20 Claims, 11 Drawing Sheets

CONNECTOR TABLE
505

| DATA CONNECTOR IDS 510 | DATA ACCESS FORMAT INFO 520 | REPOSITORY IDS 530 |
|---|---|---|
| CONNECTOR ID 511 | ACCESS INFO 521 | REPOSITORY 531 |
| CONNECTOR ID 512 | ACCESS INFO 522 | REPOSITORY 532 |
| CONNECTOR ID 513 | ACCESS INFO 523 | REPOSITORY 533 |
| ... | ... | ... |
| CONNECTOR ID 514 | ACCESS INFO 524 | REPOSITORY 534 |

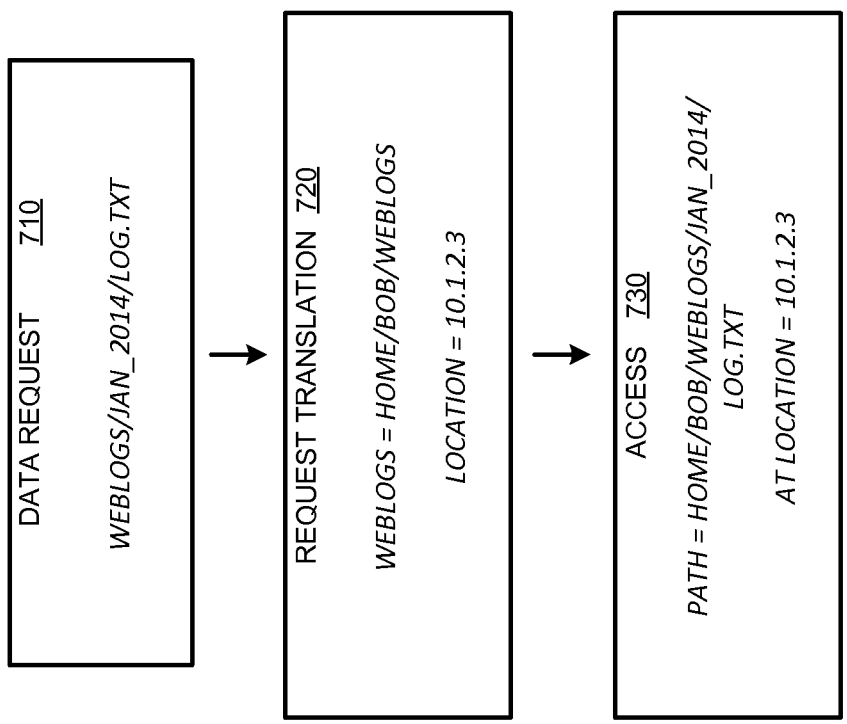

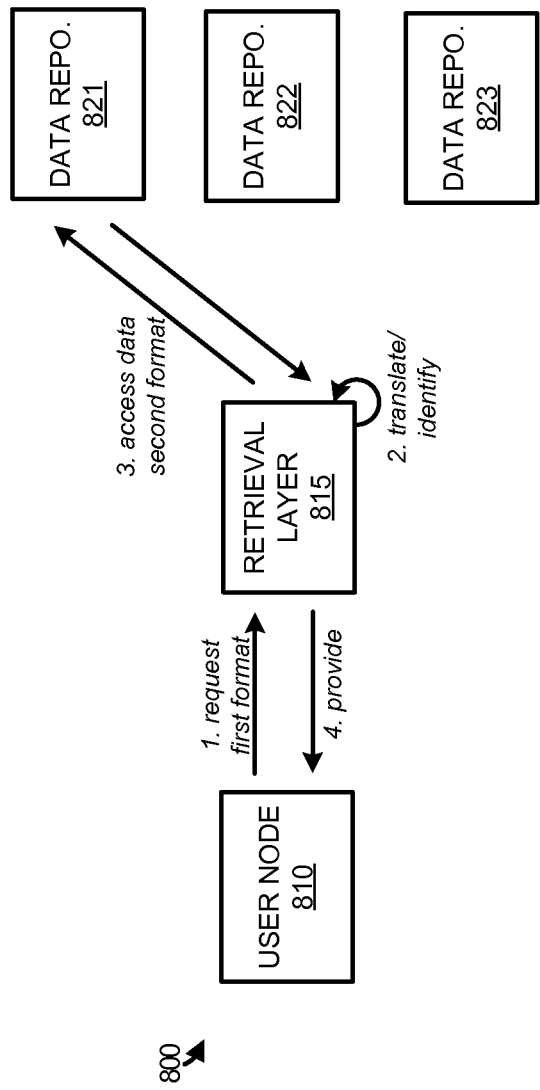

DATA CONNECTORS IN LARGE SCALE PROCESSING CLUSTERS

RELATED APPLICATIONS

This application is related to and claims priority to U.S. Provisional Patent Application No. 61/899,656, entitled "MAP-REDUCE JOB SUBMISSION TO A PERSISTENT VIRTUAL CLUSTER," filed on Nov. 4, 2013, and which is hereby incorporated by reference in its entirety.

TECHNICAL FIELD

Aspects of the disclosure are related to computing hardware and software technology, and in particular to accessing data using a plurality of data access formats.

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various applications and frameworks have been developed to interact with such large data sets, including Hive, HBase, Hadoop, Amazon S3, and CloudStore, among others.

At the same time, virtualization techniques have gained popularity and are now commonplace in data centers and other environments in which it is useful to increase the efficiency with which computing resources are used. In a virtualized environment, one or more virtual machines are instantiated on an underlying computer (or another virtual machine) and share the resources of the underlying computer. However, deploying data-intensive distributed applications across clusters of virtual machines has generally proven impractical due to the latency associated with feeding large data sets to the applications. Additionally, distributed applications may encounter issues when attempting to access multiple data repositories, which are only accessible via different data access formats.

OVERVIEW

Provided herein are systems, methods, and software to implement data connectors in a computing environment. In one example, a method of interfacing between a processing node and a plurality of data repositories includes identifying, for the processing node, a data access request using a first data access format, wherein the data access request includes a data connector identifier. The method further includes translating the access request to a second data access format based on the data connector identifier, and identifying a data repository in the plurality of data repositories to service the data access request based on the data connector identifier. The method also provides accessing data for the data access request in the data repository via the second data access format.

In another instance, a computer apparatus to interface between a processing node and a plurality of data repositories includes processing instructions that direct a retrieval layer computing system to identify, for the processing node, a data access request using a first data access format, wherein the data access request includes a data connector identifier. The processing instructions further direct the retrieval layer computing system to translate the access request to a second data access format based on the data connector identifier, and identify a data repository in the plurality of data repositories to service the data access request based on the data connector identifier. The processing instructions also direct the retrieval layer computing system to access data for the data access request in the data repository via the second access format. The computer apparatus also includes one or more non-transitory computer readable media to store the processing instructions.

In a further example, a computer apparatus to generate data connectors between a processing node and a plurality of data repositories includes processing instructions that direct an administration computing system to identify data connector information associated with a data repository. The processing instructions further direct the administration computing system to generate a data connector configuration based on the data connector information, and implement the data connector configuration in a retrieval layer configured to access data for the processing node. The computer apparatus also includes one or more non-transitory computer readable media to store the processing instructions.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 5 is a table diagram illustrating an example data structure for translating data connector identifiers to data repositories.

FIG. 7 is a diagram illustrating an overview of identifying a data repository and format.

FIG. 8 is a block diagram illustrating an operational scenario of a user accessing data using predefined data connectors.

TECHNICAL DISCLOSURE

Various implementations described herein provide for translating data access requests based on data connector identifiers. In particular, large scale processing format (LSPF) clusters provide systems and processes that allow large scale processing to be accomplished in parallel using a plurality of processing nodes. These processing nodes may include physical computing devices in some examples, but may also comprise virtual elements or machines that execute via one or more host computing systems. These virtual elements abstract the components of the host computing system and provide a segregated environment that executes without dependencies on other processes executing on the host.

In the present example, each LSPF cluster may be communicatively coupled to a plurality of data repositories that may include Gluster repositories, Blob repositories, NFS repositories, Hadoop Distributed File System (HDFS) repositories, or any other similar repository. Accordingly, one data access format may be unable to access the data on each of the various repositories. To assist in this issue, a retrieval layer that acts as an intermediary between the processing nodes and the data repositories may be used to translate data access requests from the processing nodes to a format expected by the various data repositories. In some examples, a file system may be created that is used by the processing nodes to encompass all of the various storage repositories. Thus, based on the special file system used by the nodes, the retrieval layer may use information in the file system request to translate the request to the appropriate data access format.

Figure 1:
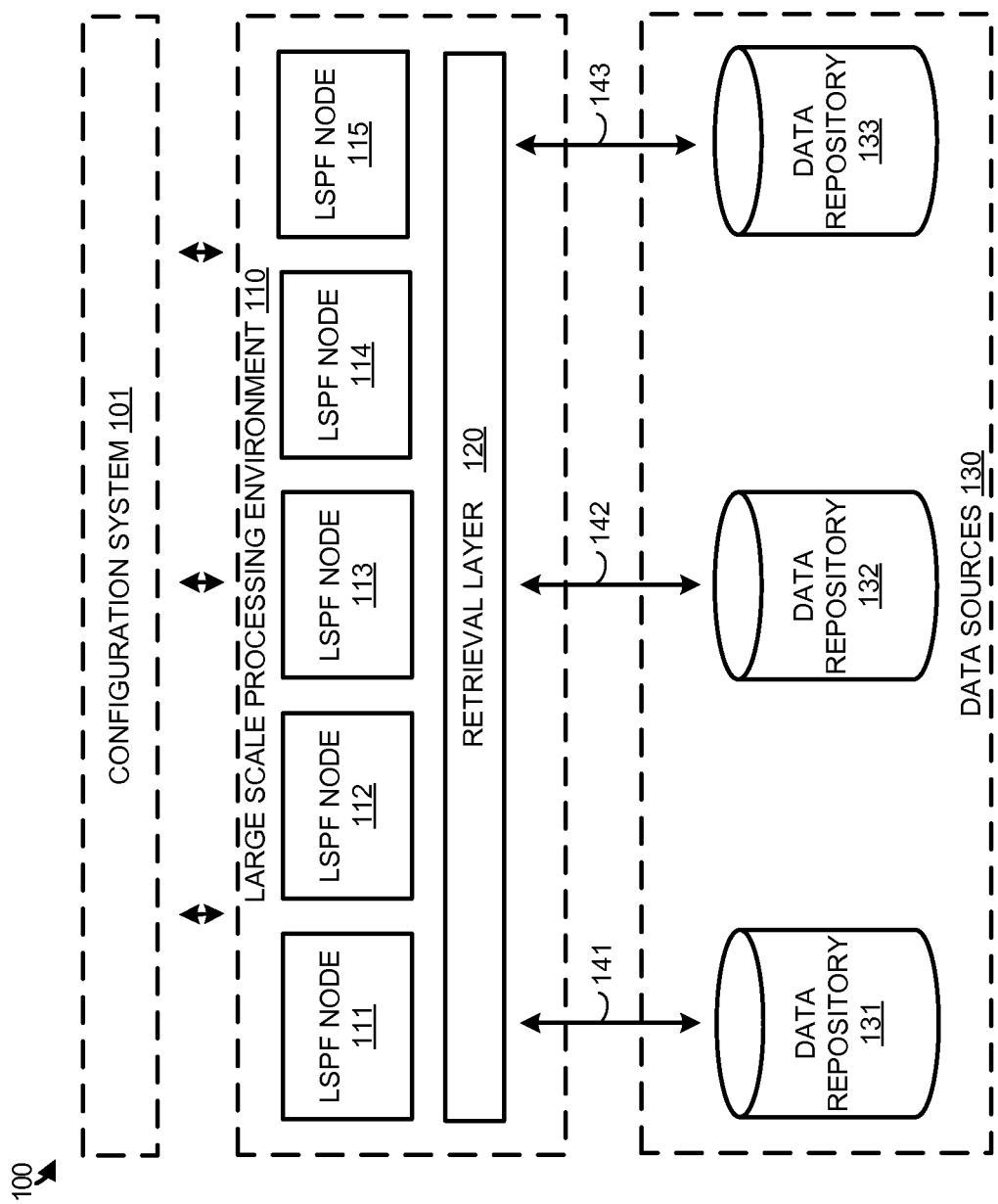
FIG. 1 is a block diagram illustrating a distributed data processing computing environment.

To further illustrate the interaction between processing nodes and data repositories, FIG. 1 is provided. FIG. 1 is a block diagram 100 illustrating a distributed data processing computing environment. Block diagram 100 includes configuration system 101, large scale processing environment 110, and data sources 130. Large scale processing environment 110 further includes LSPF nodes 111-115 and retrieval layer 120. Data sources 130 further includes data repositories 131-133. LSPF nodes 111-115 gather data from data repositories 131-133 via retrieval layer 120, which interfaces with data repositories 131-133 over communication links 141-143.

In operation, configuration system 101 is used to provide configuration information to large scale processing environment 110. This configuration information may include job process information, cluster provisioning information, and data connector information to interface to the plurality of data repositories in data sources 130. Data repositories 131-133 may comprise a variety of repositories formatted in a variety of data access formats, including Gluster repositories, Blob repositories, NFS repositories, HDFS repositories, or any other similar repository. Accordingly, each of the repositories may be inaccessible using a single data access format.

To combat the issue of using a plurality of data access formats, retrieval layer 120 may be configured to translate data requests from LSPF nodes 111-115 into a data access format expected by the plurality of data repositories 131-133. In some examples, the nodes may use a special file system that provides for easier translation within retrieval layer 120. This special file system may use data connector identifiers to identify the appropriate data access settings or information for each of the data calls. For example, an administrator in configuration system 101 may enter data connector configuration information for data repository 131. This information may include a name or identifier for the repository, the Internet Protocol (IP) address for the repository, the type of repository, such as Gluster, NFS, HDFS, and the like, or any other similar information about the repository. Based on this information, LSPF nodes 111-115 may request data using the special file system format that includes at least the identifier for the repository. In turn, the identifier may be translated into the particular data access format for the repository associated with the identifier.

Figure 2:
FIG. 2 is a block diagram illustrating a process for translating data access requests based on data connector identifiers.

To further demonstrate the operations of retrieval layer 120, FIG. 2 is provided. Figure is a block diagram 200 illustrating a process for translating data access requests based on data connector identifiers. As described in FIG. 1, an administrator may define and manage data connectors that allow LSPF clusters and nodes to access data in a plurality of data repository types. These data connector definitions allow LSPF nodes 111-115 to access data in data repositories 131-133 without using the proper data access format for the repositories.

Accordingly, as described in FIG. 2, retrieval layer 120 may identify a data request in a first data access format for the LSPF nodes (201). Once identified, retrieval layer 120 may translate the access request to a second data access format based on a data connector identifier included in the data access request (203), and identify a data repository based on the data connector (205). Further, once the translation and identification processes are complete, retrieval layer 140 may access the identified data repository using the second data access format (207).

Referring to FIG. 1 as an example, LSPF nodes 111-115 may require data from data repositories 131-133. Accordingly, LSPF node 111 may initiate a data request that is identified by retrieval layer 120. In response to identifying the request, retrieval layer translates the request from a first access format to a second access format based on a connector identifier included in the request, and also identifies the location of the data repository based on the connector identifier. Once identified, retrieval layer 120 may be used to access the data via the identified format and location.

Returning to the elements of FIG. 1, configuration system 101, large scale processing environment 110, and data sources 130 may each include one or more processing systems, storage systems, communication interfaces, user interfaces, memory devices, amongst a variety of other computing related systems. In particular, configuration system 101 may comprise at least one desktop computer, laptop computer, tablet computer, server computer, smart telephone, or some other similar computing device with the ability to configure large scale processing environment 110. Large scale processing environment 110 may include one or more desktop computers, server computers, or the like capable of providing LSPF nodes 111-115. LSPF nodes 111-115 may include physical computing device in some examples, but may also comprise virtual machines or containers in other instances. Further, retrieval layer 120 may comprise a distributed process that interfaces with each of LSPF nodes 111-115 and may execute wholly or partially on the same computing systems as LSPF nodes 111-115. Data sources 130 may comprise one or more server or desktop computing systems with the ability to provide storage for storage repositories 131-133.

Configuration system 101 may communicate with the computing systems in large scale processing environment 110 using TDM, IP, Ethernet, optical networking, wireless protocols, communication signaling, or some other communication format, including combinations thereof. Similarly large scale processing environment 110 may communicate with data repositories 131-133 over communication links 141-143 using TDM, IP, Ethernet, optical networking, wireless protocols, communication signaling, or some other communication format, including combinations thereof.

Figure 3:
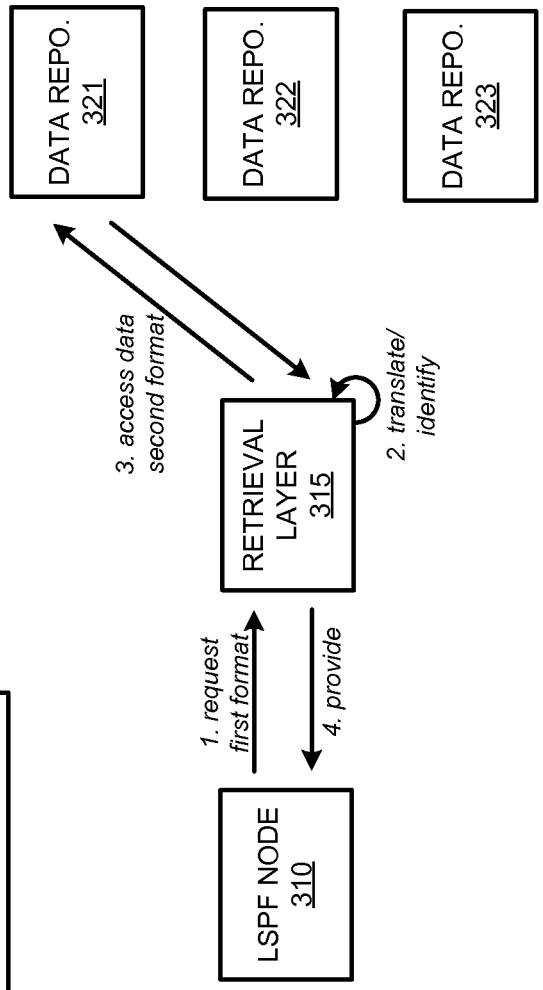
FIG. 3 is a block diagram illustrating an operational scenario for accessing data via data connector identifiers.

Turning to FIG. 3, FIG. 3 is a block diagram illustrating an operational scenario 300 for accessing data via data connectors. Operational scenario 300 includes LSPF node 310, retrieval layer 315, and data repositories 321-323. As illustrated, LSPF node 310 initiates a request for data using a first data access format. This data access format may include an overarching file system format that is capable of including data connector identifiers for translation into access formats required for the data repositories.

Once the request is identified by retrieval layer 315, retrieval layer 315 translates the request into a second data access format that corresponds to the data connector identifier within the request, and further identifies the location of the data repository based on the data connector identifier. Here, the request from LSPF node 310 includes an identifier that is associated with data repository 321. Accordingly, retrieval layer 315 will access data repository 321 using the address associated with the connector identifier, and further access the data in a format corresponding to data repository 321. These formats may include individualized formats capable of accessing Gluster repositories, Blob repositories, NFS repositories, Hadoop Distributed File System (HDFS) repositories, or any other similar repository. Once the data is accessed, retrieval layer 315 may be further configured to cache the data in an accessible location for LSPF node 310. Thus, rather than accessing data individually, each LSPF node within a cluster system may rely on the retrieval layer to identify requests and provide the data using the necessary format required by the data repositories being accessed.

Figure 4:
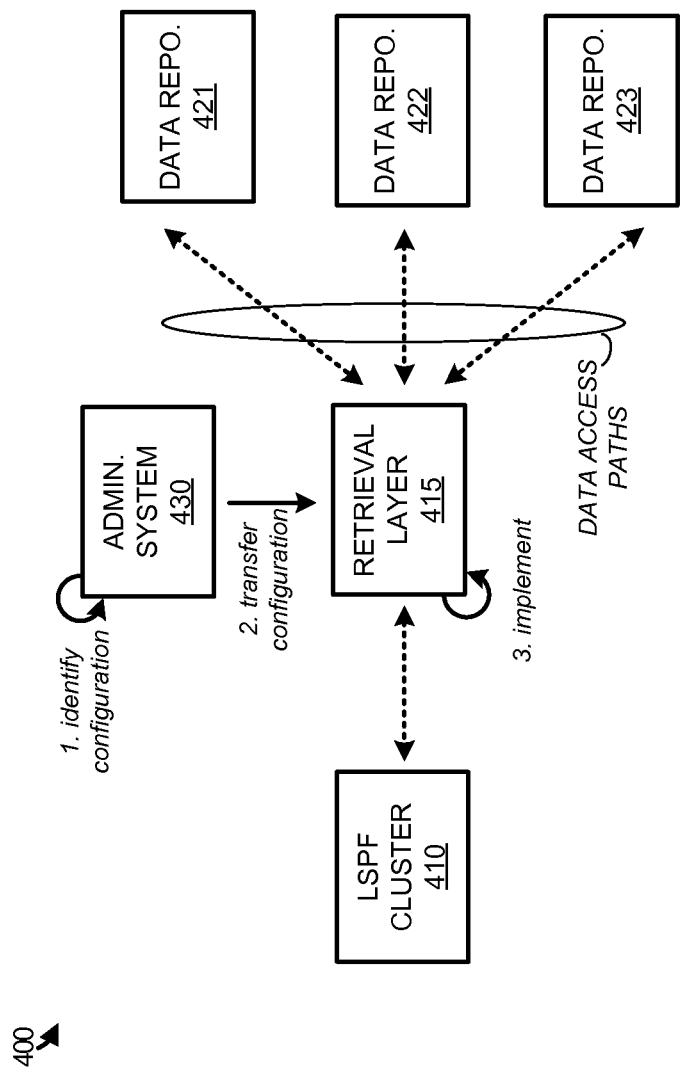
FIG. 4 is a block diagram illustrating an operational scenario for configuring a retrieval layer with data connectors.

Referring now to FIG. 4, FIG. 4 is a block diagram illustrating an operational scenario 400 for configuring a retrieval layer with data connectors. Operational scenario 400 includes LSPF cluster 410, retrieval layer 415, data repositories 421-423, and administration system 430. Administration system 430 may include any device or systems of devices capable of configuring retrieval layer 415 for accessing data from storage repositories 421-423.

In operation, organizations may store data using a variety of different formats depending on the type of data being stored, the segment of the organization that is responsible for the data, the time when the data was stored, or for any other purpose. As a result, when it is time to process the data, it may be impossible to access the data using a single data access format. For example, all data that is stored using the HDFS requires a specific data access format, whereas data that is stored using the Gluster File System may require a completely different data access format. Accordingly, to allow access to each of the data repositories without copying the data into a single repository format, access requests must be translated from the processing nodes into an access format capable of identifying data within each repository.

Here, administration system 430 is provided to allow an administrator to configure data connectors that make each of repositories 421-423 available to LSPF cluster 410. The administrator may provide information such as the IP address of each of the repositories, the data path for each of the repositories to intended data, the type of repository, an identifier for the data connector, user information for the repository, or any other similar information. Once the connector information is identified and a configuration is generated, the information is then transferred for implementation in retrieval layer 415. As described previously, retrieval layer 415 may comprise a distributed retrieval layer that may be distributed on the same computing systems that are providing the LSPF cluster. Once received by the computing systems, retrieval layer 415 may implement the configuration specified by the administrator to provide data access paths between LSPF cluster 410 and data repositories 421-423.

In some examples, administration system 430 may be used to configure a special file system that is used as an overarching system for all of the data repositories. This special file system may use the data connector identifiers to translate each request from LSPF cluster 410 into the appropriate format for the data repository. For instance, if an administrator created a new data connector called FooSequence, retrieval layer 415 may identify when FooSequence is called in a data request, and translate the request based on the information provided by the administrator in accordance with the FooSequence data connector. Thus, LSPF cluster 410 may communicate with retrieval layer 415 using a first access format, and retrieval layer 415 may communicate with data repositories 421-423 using an alternative format associated with the administrator preferences.

Turning to FIG. 5, FIG. 5 is a table diagram 500 illustrating an example data structure for translating data connector identifiers to data repositories. Table diagram 500 includes connector table 505, which comprises data connector identifiers (IDs) 510, data access format information 520, and repository IDs 530. Data connector IDs 510 comprise connector IDs 511-514 specified by an administrator creating the data connectors between a retrieval layer and data repositories. Data access format information 520 comprises access information 521-524 about paths, user names, the type of repository, and other information regarding the particular source of data for the connection. Repository IDs 530 comprise location information about each of the repositories 531-534, such as an IP address or some other location information for the repository. Although illustrated with a single location in the present example, it should be understood that each of connector IDs 511-514 might be associated with a plurality of locations. Accordingly, if a first location is unavailable to provide the data, the retrieval layer may use another location to provide the requested data.

To generate connector table 505, an administrator using an administration computing system may identify a plurality of data repositories that are required to perform specific tasks. Once identified, the user may input information about the repositories, including a name for the data connector, the type of file system that is used by the repository, the IP location of the repository, the path to the requested location within the repository, user name or password information, or any other information required to access the particular data. Once identified, the administration system may be used to configure a retrieval layer to process data requests based on the defined data connectors. In the present example, connector table 505 is provided as the data structure to manage the information from the administrator, however, it should be understood that trees, linked lists, arrays, or any other similar data structure may be used to manage the data.

Upon storing the various data connectors within connector table 505, a cluster and its corresponding nodes may require data from one of the repositories. Thus, to allow the data calls, the retrieval layer may present a file system to the nodes that encompasses all of the various data connectors, and allows data from each connector to be requested using the data connector identifier.

For example, an administrator may generate a connector with connector ID 511, access information 521, and repository or location 531. Accordingly, when the retrieval layer identifies a data request in the file system format that includes connector ID 511, the retrieval layer will access the data at the location repository 531 using the information in the request and access information 521.

Figure 6A:
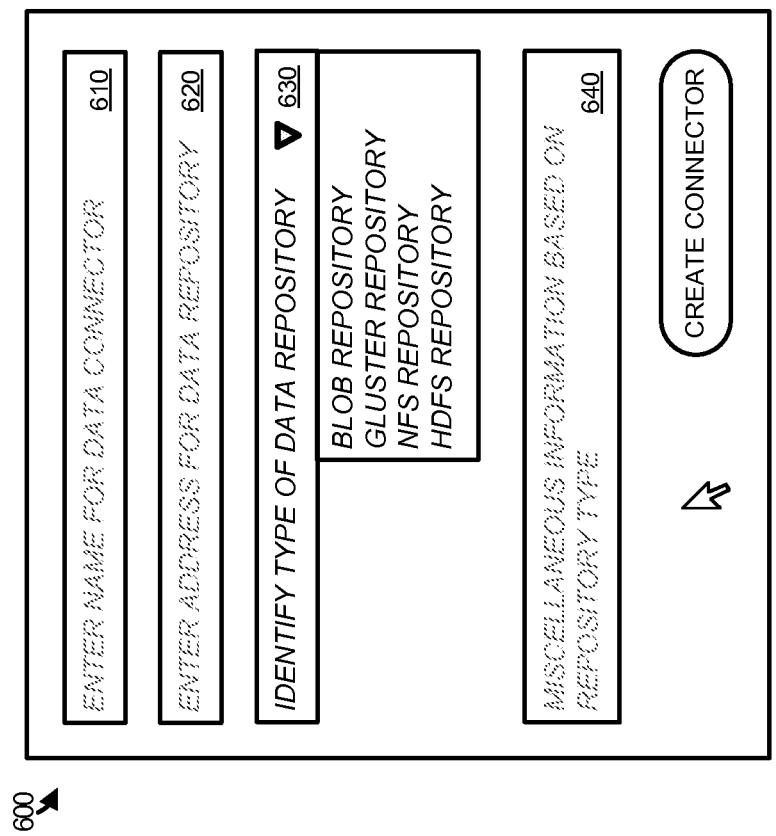
FIG. 6A is a diagram illustrating a user interface for configuring a retrieval layer with data connectors.
Figure 6B:
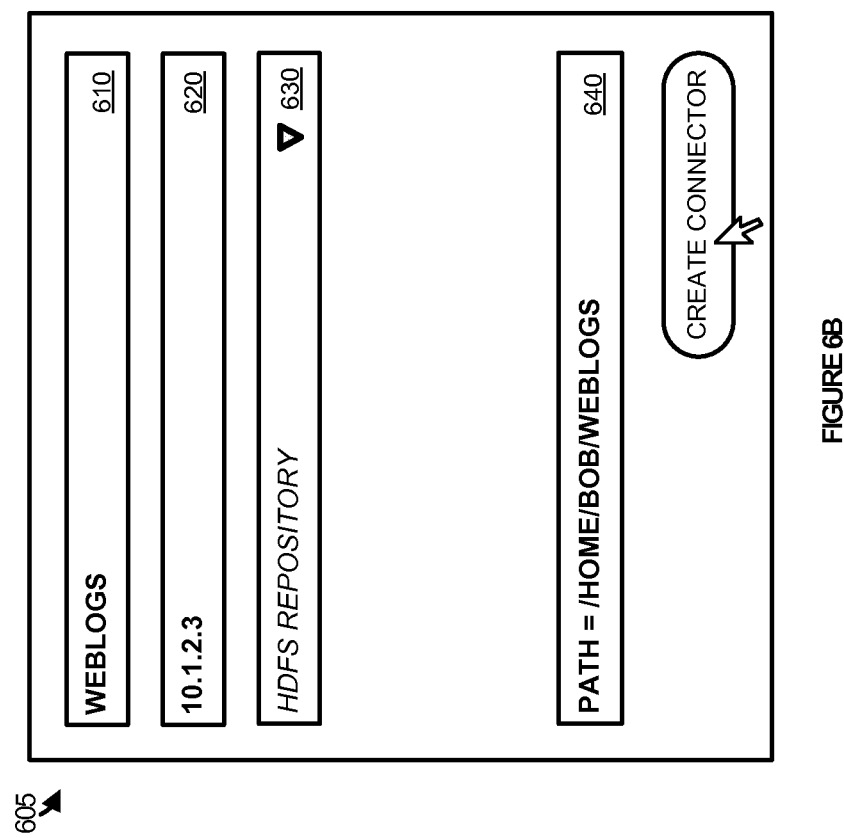
FIG. 6B is a diagram illustrating a user interface for configuring a retrieval layer with data connectors.

To further illustrate the input of information for data connectors, FIGS. 6A and 6B are provided. FIGS. 6A and 6B are diagrams illustrating a user interface for configuring a retrieval layer with data connectors. FIG. 6A is an example of an empty user interface 600 waiting for an administrator to specify the requisite information to create a data connector. In the present example, the available fields include a name or identifier for a data connector 610, an address for the data repository 620, the type of storage repository 630, and miscellaneous information based on the repository type 640. This miscellaneous information may include a path to a particular directory within the storage repository, a user name, or any other information related to the file system or object storage defined in the data repository type.

Referring now to FIG. 6B, FIG. 6B is an example of an administrator completed user interface 605. As in user interface 600, four inputs were available for the user, including connector identifier or name 610, address 620, data repository type 630, and miscellaneous information 640. Here, the user completed each of these inputs and specified that the connector identifier or name to be WEBLOGS at address 10.1.2.3, which is a HDFS repository. Further in miscellaneous information section, the administrator provided that the path or directory of relevance is located at /HOME/BOB/WEBLOGS.

Once the information is defined, and the administrator selects to create connector, a connector will be generated for the file system used between the LSPF nodes and the retrieval service. Accordingly, when a request is identified for the data connector that includes WEBLOGS, the retrieval layer may replace the term WEBLOGS with the path /HOME/BOB/WEBLOGS and access the data at address 10.1.2.3.

To further demonstrate the operation of the retrieval layer with the information provided by the administrator, FIG. 7 is included. FIG. 7 is a diagram illustrating an overview 700 of identifying a data repository and format. FIG. 7 is an example of implementing the data connector described by the administrator in FIG. 6B. As depicted a data request 710 is generated for the cluster that requests the path WEBLOGS/JAN_2014/LOG.TXT using a special file system that allows administrators to define data connectors. Referring back to FIG. 6B, the administrator defined a data connector with the identifier of WEBLOGS, a location of 10.1.2.3, and a path within the repository of HOME/BOB/WEBLOGS for the data source. Accordingly, when the retrieval layer identifies data request 710 to implement request translation 720, the retrieval layer may replace WEBLOGS with the defined path. Thus, access 730 may be performed using the complete path HOME/BOB/WEBLOGS/JAN_2014/LOG.TXT at location 10.1.2.3. Once the data is accessed, the data may be returned to the cluster to be cached for processing.

Although access 730 is illustrated with a single location in the present example, it should be understood that the location associated with the storage repository might include backup locations. For instance, if an access could not be completed using 10.1.2.3, the retrieval layer may refer to a backup location that includes the same information to perform the task. Further, although the example provided in FIG. 7 and FIG. 6B includes a HDFS repository, it should be understood that similar principles might be applied to object storage, such as a Swift data repository. Although Swift is not a hierarchical file system like HDFS, the special file system that is provided to the nodes may present the data as a file system view. Thus, despite one or more of the data repositories storing data in a non-hierarchical form, the combined file system may be used to translate each of the storage elements into a single file system that is presented to the nodes.

Despite being illustrated in the above examples as accessing data from LSPF nodes using the data connectors, it should be understood that similar principles might be used by a user, at a user processing node, to gather information from various data sources. Accordingly, a user may use the unitary file system defined by the administrator generated data connectors to gather various data and files from the data repositories.

For example, FIG. 8 is a block diagram illustrating an operational scenario 800 of a user accessing data using predefined data connectors. Operational scenario 800 includes user node 810, retrieval layer 815, and data repositories 821-823. As described previously, an administrator at an administration system may define various data connectors to make a plurality of data repositories accessible via a single file system format. These data connectors may be defined with an identifier, the type of data repository, an IP address or other location of the data repository, a root or file path to the directory within the data repository, an account or user name within the repository, or any other information to access a particular directory within the repository.

Once the data connectors are identified, a user may access the repositories using the unitary file system view that is provided to the user from retrieval layer 815. For instance, as illustrated in FIG. 8, user node 810 requests data using the single file system format. In response to the request, retrieval layer 815, which may execute wholly or partially on the same computing system as user node 810, may identify the request and translate the request for the storage repositories. This translation may include identifying the type of repository used in the request, the location of the repository, the path to the directory in the repository, or any other information to direct the request.

Once translated into the format required by the repository and directed to the proper location, retrieval layer 815 may access the data. Here, retrieval layer identifies that data repository 821 is required for the request, and translates the request based on the configuration from the administrator. After being translated and accessing the data, the data in some examples may be provided and cached in user node 810. Once cached, user node 810 may process the data as required.

Figure 9:
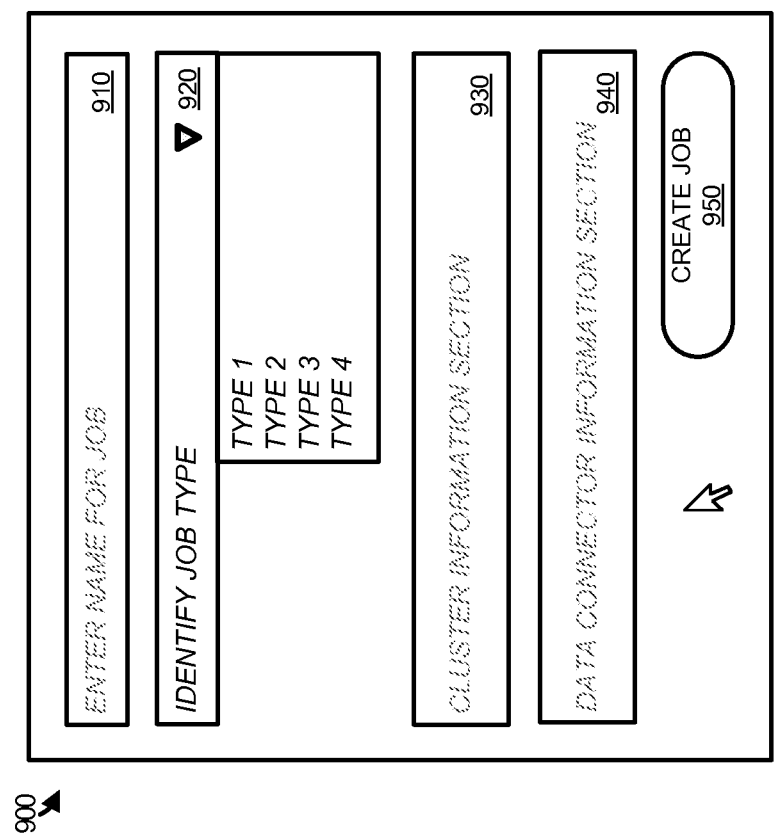
FIG. 9 is a diagram illustrating a user interface for configuring data processing clusters for use with the data connectors.

Turning to FIG. 9, FIG. 9 is a diagram illustrating a user interface 900 for configuring data processing clusters for use with the data connectors. User interface 900 includes name inputs 910, job types 920, cluster information sections 930, data connector information sections 940, and create job selector 950.

In operation, an administrator defines the various data connectors available to the users of a data processing environment. Once identified, the users may generate data processing jobs that execute via one or more LSPF nodes in the data processing environment. As illustrated in FIG. 9, the user may specify the name for the job at job input 910, as well as the type of job at input 920, such as a Hadoop processing job, High Performance Computing Cluster job, or some other job. Further, the user may define cluster information in input 930, such as the number of nodes to use in the cluster, the amount of memory, or any other resource allocation that is available to the user. Moreover, in some examples, the user may also define the data sources required to be processed using the job in data connector information section 940. This information may include one or more connectors and path information related to the job process, allowing the job process to access the data in any of the data repository types as described herein.

Figure 10:
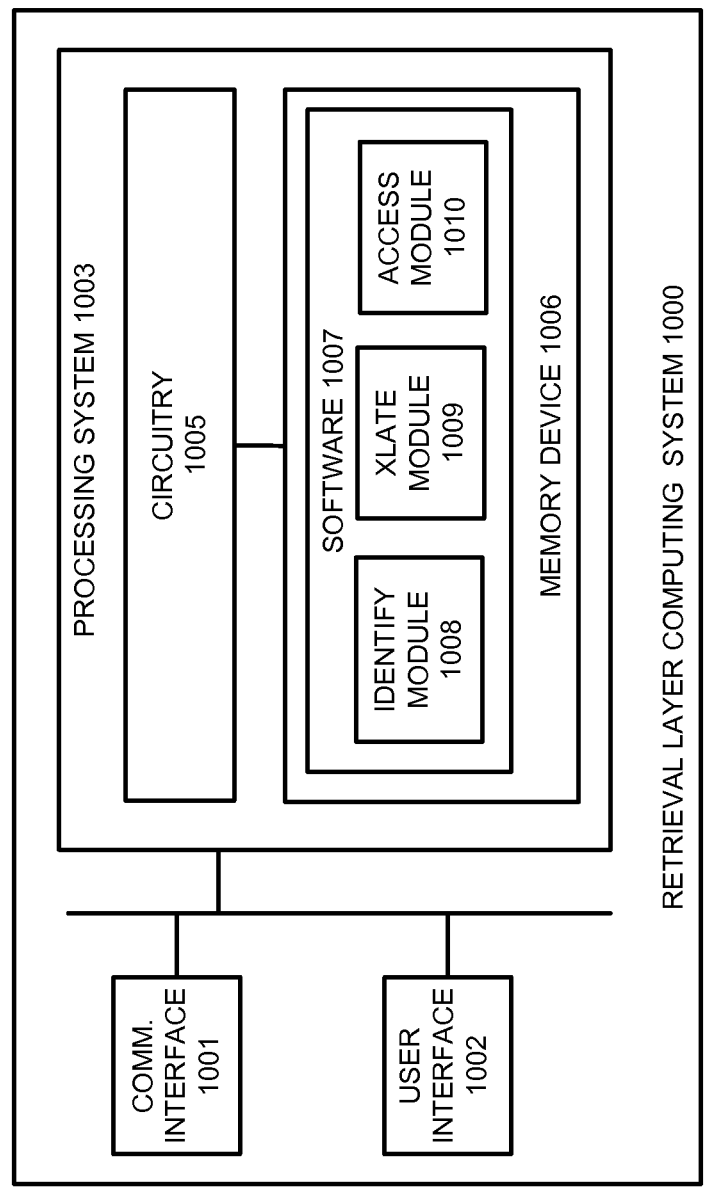
FIG. 10 is a block diagram illustrating a retrieval layer computing system.

FIG. 10 is a block diagram illustrating a retrieval layer computing system 1000. Retrieval layer computing system 1000 is representative of a computing system that may be employed in any computing apparatus, system, or device, or collections thereof, to suitably implement the retrieval layers described herein. Computing system 1000 comprises communication interface 1001, user interface 1002, and processing system 1003. Processing system 1003 is communicatively linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format, including combinations thereof. In particular, communication interface 1001 may be configured to communicate with one or more data repositories capable of storing data for processing within a user or LSPF node.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Operating software 1007 comprises computer programs, firmware, or some other form of machine-readable processing instructions. Operating software 1007 includes identify module 1008, translate module 1009, and access module 1010, although any number of software modules may provide the same operation. Operating software 1007 may further include an operating system, utilities, drivers, network interfaces, applications, or some other type of software. When executed by circuitry 1005, operating software 1007 directs processing system 1003 to operate computing system 1000 as described herein.

In particular, identify module 1008 is configured to identify data requests from user or LSPF processing nodes. Once identified, translate module 1009 translates the request from a first data access format to a second data access format, and identifies a location of the storage repository designated for the request. In response to the translation, access module 1010 accesses the data in the appropriate data repository. In some examples, once the data is accessed, retrieval layer computing system 1000 caches the data in memory accessible to the processing node allowing the node to process data from the appropriate storage location. Thus, data may be requested, using a first data access format, translated into a second access format, and provided to the node transparently.

In some instances, to configure retrieval layer computing system 1000, computing system 1000 may be in communication with an administration system, which may comprise a server, desktop, laptop, tablet, smart telephone, or some other computing system capable of identifying data connector information. Once the connector information is received, the connector information may be used to configure the translation mechanism in computing system 1000. In some instances, computing system 1000 may present a unitary file system that is capable of accessing a plurality of data repositories using data connector identifiers. Accordingly, when a request is generated from a processing node, computing system 1000 will determine the data connector identifier and, based on the information provided in the configuration, translate the request for the data repository.

Figure 11:
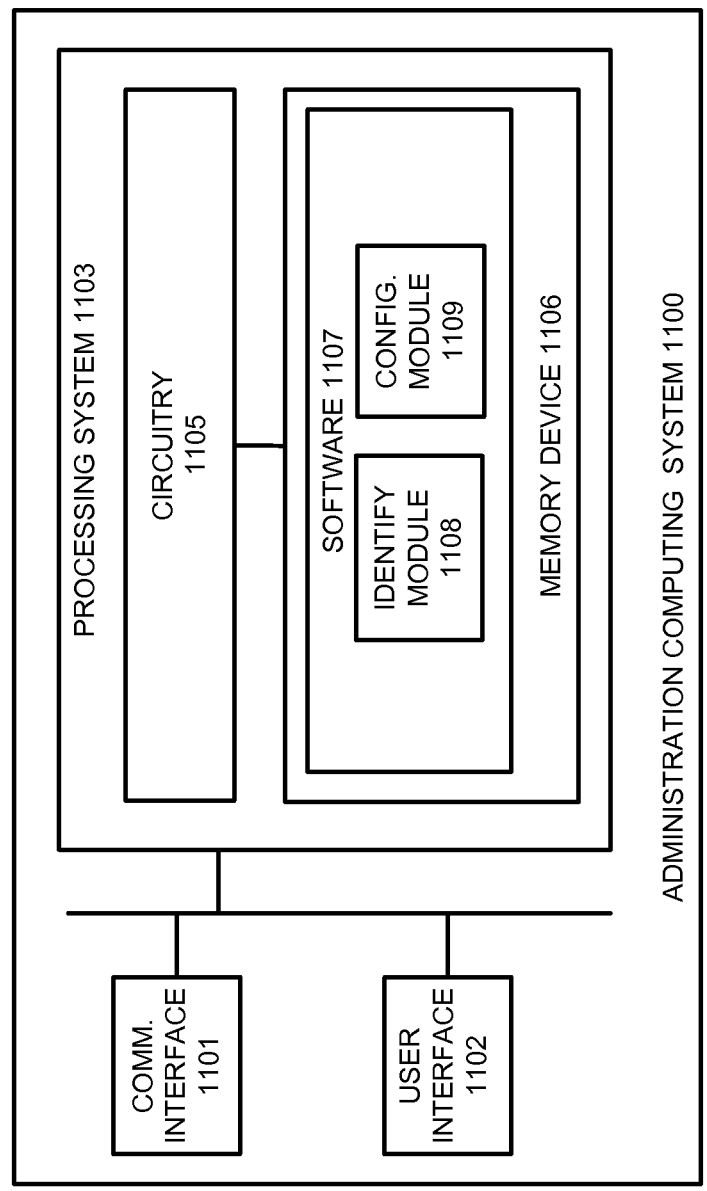
FIG. 11 is a block diagram illustrating an administration system computing system.

To further illustrate the operations of the administration system, FIG. 11 is provided. FIG. 11 is a block diagram illustrating an administration system computing system 1100. Administration computing system 1100 is representative of a computing system that may be employed in any computing apparatus, system, or device, or collections thereof, to suitably implement the retrieval layers described herein. Computing system 1100 comprises communication interface 1101, user interface 1102, and processing system 1103. Processing system 1103 is communicatively linked to communication interface 1101 and user interface 1102. Processing system 1103 includes processing circuitry 1105 and memory device 1106 that stores operating software 1107.

Communication interface 1101 comprises components that communicate over communication links, such as network cards, ports, RF transceivers, processing circuitry and software, or some other communication devices. Communication interface 1101 may be configured to communicate over metallic, wireless, or optical links. Communication interface 1101 may be configured to use TDM, IP, Ethernet, optical networking, wireless protocols, communication signaling, or some other communication format, including combinations thereof. In particular, communication interface 1101 may communicate with a retrieval layer executing on one or more computing systems to act as a retrieval tool between processing nodes and data repositories.

User interface 1102 comprises components that interact with a user. User interface 1102 may include a keyboard, display screen, mouse, touch pad, or some other user input/output apparatus. User interface 1102 may be used to receive data connector information related to data repositories to be used in data processing. This information may include an identifier or name for the data connector, the location of the data repository, the type of repository, root or path information for the target information or any other similar information.

Processing circuitry 1105 comprises microprocessor and other circuitry that retrieves and executes operating software 1107 from memory device 1106. Memory device 1106 comprises a non-transitory storage medium, such as a disk drive, flash drive, data storage circuitry, or some other memory apparatus. Operating software 1107 comprises computer programs, firmware, or some other form of machine-readable processing instructions. Operating software 1107 includes identify module 1108 and configure module 1109, although any number of software modules may provide the same operation. Operating software 1107 may further include an operating system, utilities, drivers, network interfaces, applications, or some other type of software. When executed by circuitry 1105, operating software 1107 directs processing system 1103 to operate computing system 1100 as described herein.

In particular, identify module 1108 is configured to determine administrator preferences regarding the data connectors. These preferences may include the data repositories to be used, the locations of the repositories, paths to the root of the particular information in the repository, identifier information for the repository, or any other similar information. Once the information is retrieved, configuration module 1109 generates a configuration that allows a first data access format to be used by the processing nodes, wherein the first data access format allows a retrieval layer to translate data requests into a format that is expected by the data repositories.

For example, an administrator may initiate generation of a data connector with a particular identifier, location, and path. Based on these specifications, a configuration may be generated that allows processing nodes to request data using a first data access format with the identifier. Once the connector is implemented and a request is identified, the retrieval layer may translate the request based on the identifier, and access the data using a second data access format generated from the translation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a data retrieval process on a host computing system that interfaces between a plurality of processing nodes on the host computing system that use a first data access format and a plurality of data repositories accessible using a plurality of second data access formats, wherein each of the plurality of data repositories is accessible using a data access format of the plurality of second data access formats, the method comprising:
   identifying, for a processing node in the plurality of processing nodes, a data access request using the first data access format, wherein the data access request includes a data connector identifier;
   translating the data access request from the first data access format to a second data access format of the plurality of second data access formats based on the data connector identifier, wherein the plurality of second data access formats are each associated with a distributed file system type of a plurality of distributed file system types used for storing data in the plurality of data repositories;
   identifying a data repository in the plurality of data repositories to service the data access request based on the data connector identifier; and
   accessing data for the data access request in the data repository via the second data access format.

2. The method of claim 1 wherein the processing node comprises a large scale processing format (LSPF) node.

3. The method of claim 2 wherein the LSPF node comprises a container.

4. The method of claim 2 wherein the LSPF node comprises a virtual machine.

5. The method of claim 1 wherein the first data access format comprises a first file system format.

6. The method of claim 1 wherein the first data access format cannot access any of the plurality of data repositories without translation to an alternative data access format.

7. The method of claim 1 wherein the second data access format comprises one of Hadoop Distributed File System (HDFS) format, Gluster File System format, Swift object storage system, or network file system format.

8. The method of claim 1 wherein identifying the data repository in the plurality of data repositories to service the data access request based on the data connector identifier comprises identifying a data repository Internet Protocol (IP) address to service the data access request based on the data connector identifier.

9. A non-transitory machine readable medium storing instructions for interfacing between a plurality of processing nodes executing on a host computing system that use a first data access format and a plurality of data repositories accessible using a plurality of second data access formats, wherein each of the plurality of data repositories is accessible using a data access format of the plurality of second data access formats, and the instructions, when executed by a processing system, direct the processing system to:
   identify, for a processing node in the plurality of processing nodes, a data access request using the first data access format, wherein the data access request includes a data connector identifier;
   translate the data access request from the first data access format to a second data access format of the plurality of second data access formats based on the data connector identifier, wherein the plurality of second data access formats are each associated with a distributed file system type of a plurality of distributed file system types used for storing data in the plurality of data repositories;
   identify a data repository in the plurality of data repositories to service the data access request based on the data connector identifier; and
   access data for the data access request in the data repository via the second data access format.

10. The non-transitory machine readable medium of claim 9 wherein the processing node comprises a large scale processing format (LSPF) node.

11. The non-transitory machine readable medium of claim 10 wherein the LSPF node comprises a container.

12. The non-transitory machine readable medium of claim 10 wherein the LSPF node comprises a virtual machine.

13. The non-transitory machine readable medium of claim 9 wherein the first data access format comprises a first file system format.

14. The non-transitory machine readable medium of claim 9 wherein the first data access format cannot access any of the plurality of data repositories without translation to an alternative data access format.

15. The non-transitory machine readable medium of claim 9 the second data access format comprises one of Hadoop Distributed File System (HDFS) format, Gluster File System format, Swift object storage system, or network file system format.

16. The non-transitory machine readable medium of claim 9 wherein the instructions, when executed by the processing system, direct the processing system to identify the data repository in the plurality of data repositories to service the data access request based on the data connector identifier direct the processing system to identify a data repository Internet Protocol (IP) address to service the data access request based on the data connector identifier.

17. An apparatus to interface between a plurality of processing nodes executing on a host computing system that use a first data access format and a plurality of data repositories accessible using a plurality of second data access formats, wherein each of the plurality of data repositories is accessible using a data access format of the plurality of second data access formats, the apparatus comprising:
- one or more non-transitory computer readable storage media;
- a processing system of the host computing system operatively coupled to the one or more non-transitory computer readable storage media; and
- processing instructions stored on the one or more non-transitory computer readable media that, when executed by the processing system direct the processing system to at least:
  - identify, for a processing node of the plurality of processing nodes, a data access request using the first data access format, wherein the data access request includes a data connector identifier;
  - translate the data access request from the first data access format to a second data access format of the plurality of second data access formats based on the data connector identifier, wherein the plurality of second data access formats are each associated with a distributed file system type of a plurality of distributed file system types used for storing data in the plurality of data repositories;
  - identify a data repository in the plurality of data repositories to service the data access request based on the data connector identifier; and
  - access data for the data access request in the data repository via the second data access format.

18. The apparatus of claim 17 wherein the plurality of processing nodes comprises a plurality of virtual nodes that provide a large scale processing framework (LSPF).

19. The apparatus of claim 18 wherein the plurality of virtual of virtual nodes comprise a plurality of virtual machines or containers.

20. The apparatus of claim 17 wherein the processing instructions further direct the processing system to:
- identify, for a second processing node in the plurality of processing nodes, a second data access request using the first data access format, wherein the second data access request includes a second data connector identifier;
- translate the second data access request from the first access format to a third data access format of the plurality of second data access formats based on the second data connector identifier;
- identify a second data repository in the plurality of data repositories to service the second data access request based on the second data connector identifier; and
- access second data for the second data access request in the second data repository via the third data access format.

* * * * *